United States Patent [19]
Lauronen et al.

[11] Patent Number: 6,135,484
[45] Date of Patent: Oct. 24, 2000

[54] TOW BAR CONSTRUCTION FOR TRANSPORT VEHICLES AND TRANSPORT VEHICLE COMBINATIONS, AND A TRANSPORT VEHICLE COMBINATION

[75] Inventors: Joel Lauronen; Esa Östring, both of Helsinki, Finland

[73] Assignee: Tamrock OY, Tampere, Finland

[21] Appl. No.: 09/091,720

[22] PCT Filed: Dec. 23, 1996

[86] PCT No.: PCT/FI96/00696

§ 371 Date: Jun. 23, 1998

§ 102(e) Date: Jun. 23, 1998

[87] PCT Pub. No.: WO97/24248

PCT Pub. Date: Jul. 10, 1997

[30] Foreign Application Priority Data

Dec. 27, 1995 [FI] Finland ..................................... 956283

[51] Int. Cl.[7] .................................................. B62D 13/00
[52] U.S. Cl. ...................... 280/444; 280/419; 280/476.1; 280/445
[58] Field of Search ................................ 280/411.1, 419, 280/426, 442, 443, 444, 476.1, 400, 445; 180/235, 237

[56] References Cited

U.S. PATENT DOCUMENTS

| 1,378,436 | 5/1921 | Arato . | |
|---|---|---|---|
| 1,585,133 | 5/1926 | Van Der Hof | 280/419 |
| 2,785,909 | 3/1957 | Barnard . | |
| 3,690,698 | 9/1972 | Humes . | |
| 5,364,117 | 11/1994 | Keith | 280/442 |

FOREIGN PATENT DOCUMENTS

| 43628 | 1/1982 | European Pat. Off. | 280/442 |
|---|---|---|---|
| 253725 | 1/1988 | European Pat. Off. | 280/442 |
| 342179 | 10/1921 | Germany . | |
| 342861 | 10/1921 | Germany . | |
| 870069 | 1/1953 | Germany . | |
| 923770 | 2/1955 | Germany | 280/442 |
| 1115591 | 10/1961 | Germany | 280/419 |
| 3616457 | 11/1987 | Germany . | |
| 7805646 | 11/1979 | Netherlands | 280/442 |
| 212156 | 4/1967 | Sweden . | |
| 428046 | 4/1935 | United Kingdom | 280/442 |
| 2232133 | 12/1990 | United Kingdom | 280/442 |
| WO 93/05968 | 4/1993 | WIPO . | |

*Primary Examiner*—Daniel G. DePumpo
*Attorney, Agent, or Firm*—Nixon & Vanderhye P.C.

[57] ABSTRACT

The invention relates to transport vehicles and combinations thereof and their tow bar constructions comprising a tow bar journalled to the front of the chassis rotatably relative to a vertical and a horizontal axle, and structure for turning the axle. The structure for turning the axle comprise a steering lever secured to the tow bar rotatably relative to the center line of its vertical axle, and supporting arms secured at one end to the steering lever on opposite sides of the vertical axle and at the other end to the axle on its opposite sides.

16 Claims, 9 Drawing Sheets

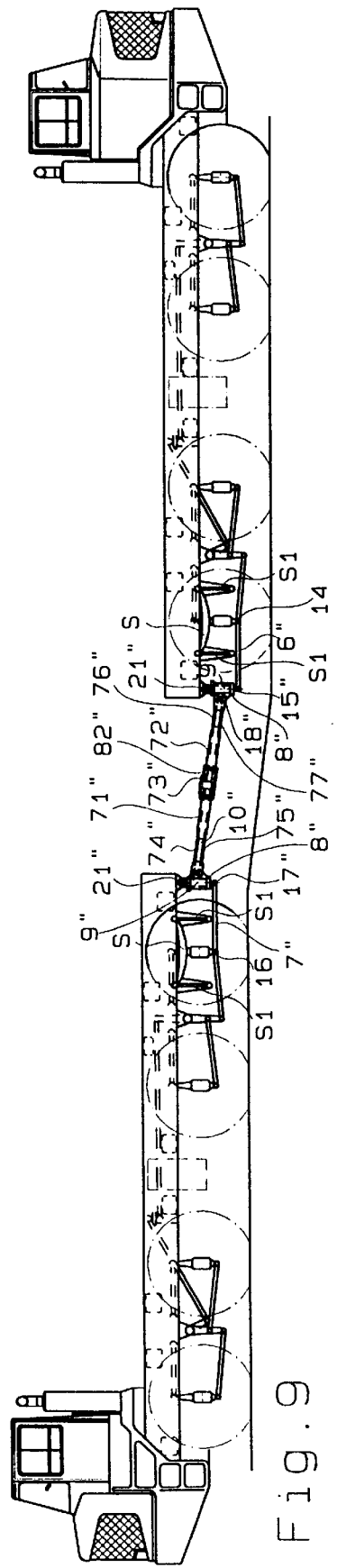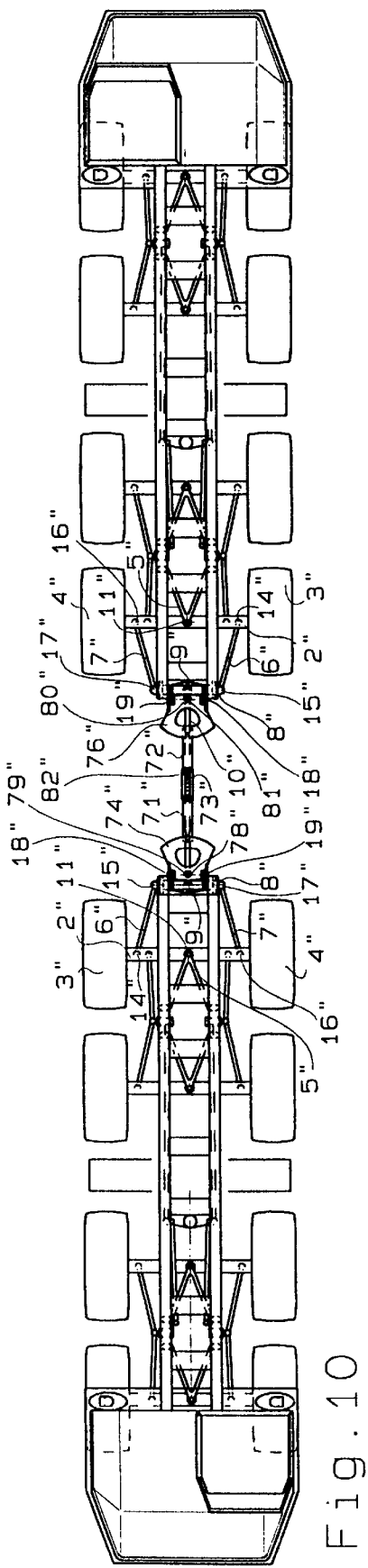

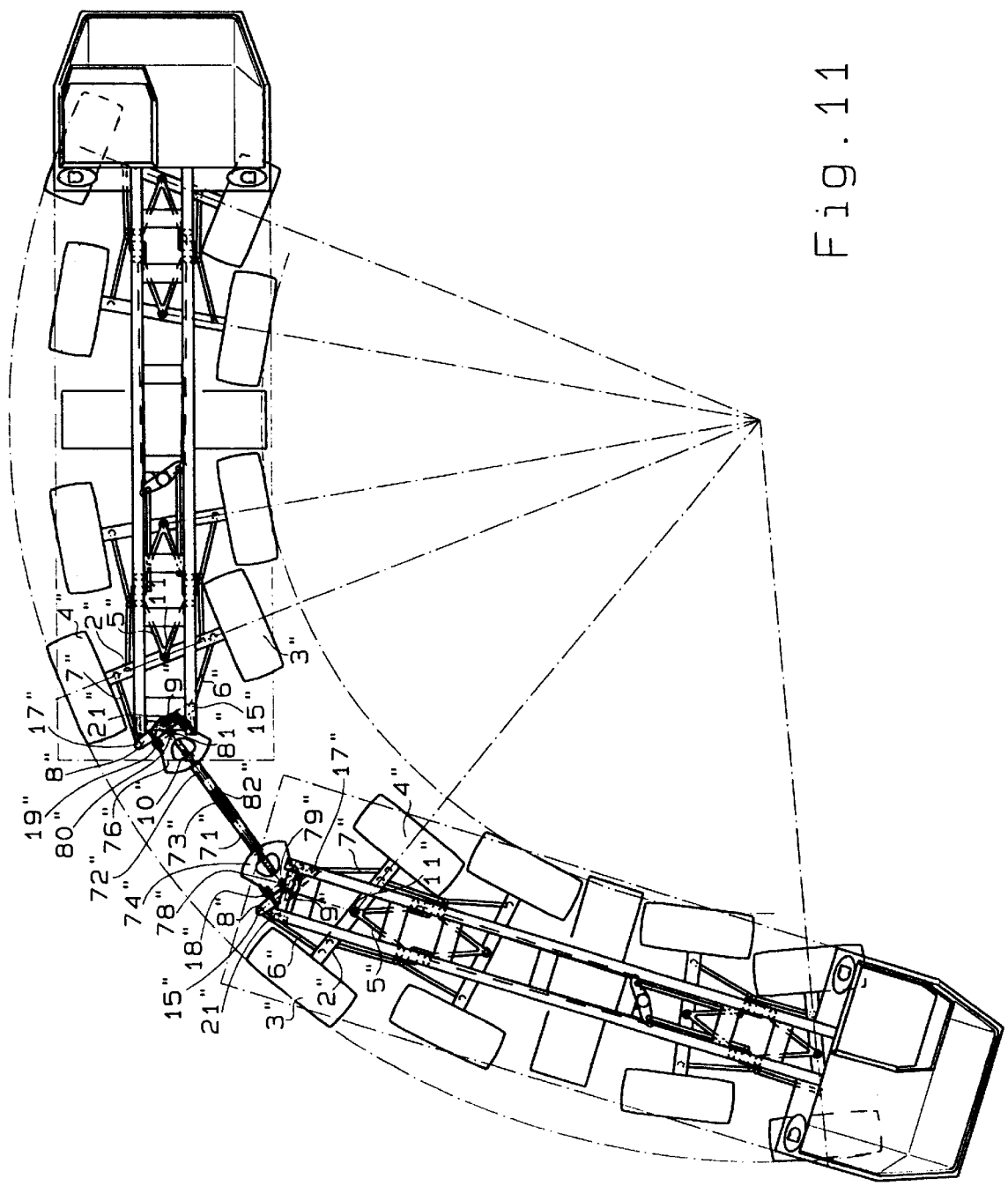

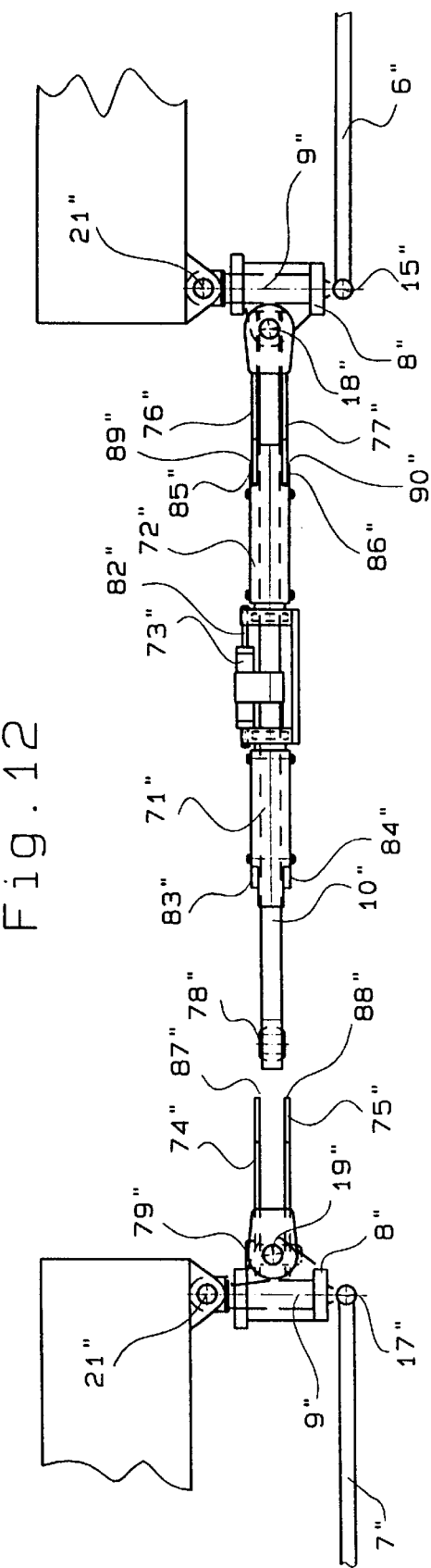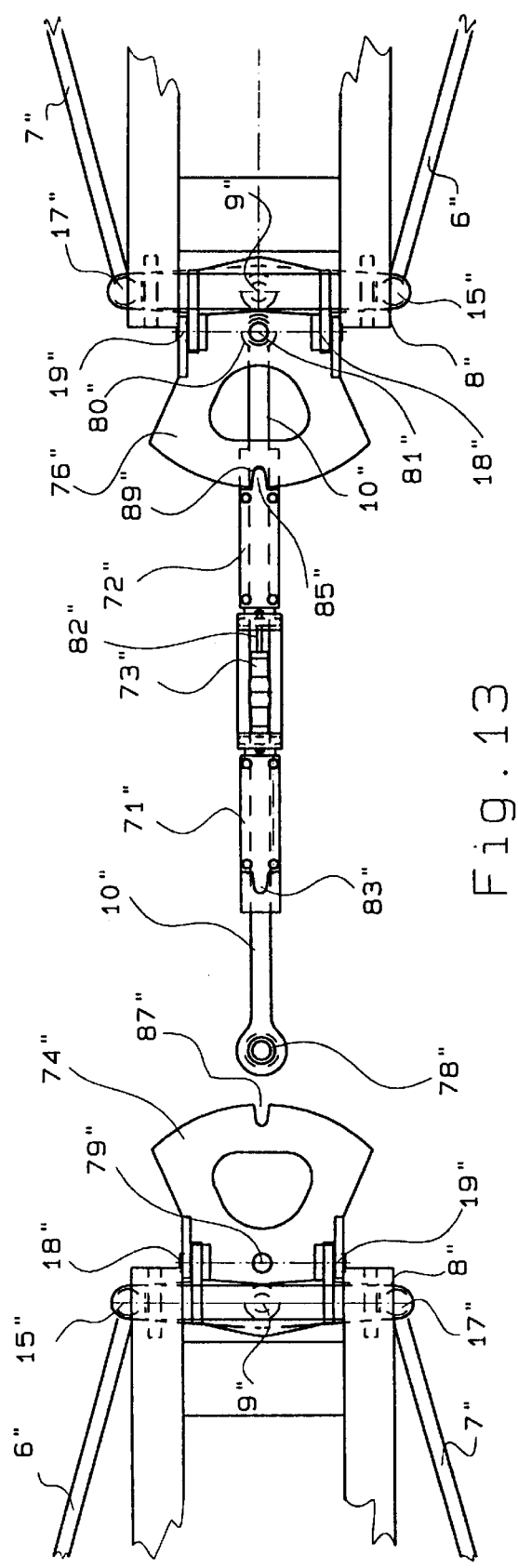

TOW BAR CONSTRUCTION FOR TRANSPORT VEHICLES AND TRANSPORT VEHICLE COMBINATIONS, AND A TRANSPORT VEHICLE COMBINATION

BACKGROUND AND SUMMARY OF THE INVENTION

The invention relates to tow bar constructions for commercial vehicles, more particularly trucks, trailers, and their tractors, which may commonly be called transport vehicles. Axle assemblies found in these vehicles have been described e.g. in Finnish Patents 84,895 and 89,570. The invention further relates to transport vehicle combinations some of which comprise axle and/or tandem axle assemblies of the type described above.

Steerable rigid axles are used in special heavy transports, in which one or more axles have to be steered since they typically number more than two, and since the wheel turning radius of the vehicle is insufficient without steering. Rigid axles are used because of the heavy load and the simple structure. It is also crucial that the load be distributed evenly on all axles in rough terrain, in that the travel direction of the wheels is at all times towards their direction of rotation in curves and when travelling straight ahead.

Twin wheels with independent suspension have generally been used, the construction meeting the requirements set on turning and load distribution.

Axles fixedly journalled to the chassis by means of a turntable can also be used. The requirements set on turning are met, but not those set on load distribution when there are several axles, since the axles have not been coupled together in the turntable construction. Nor is the requirement that the wheels move in their direction of rotation met if several axles are supported by the turntable, or if several axles are directly suspended on the chassis. In this case the resistance to motion of the transport vehicle becomes high in curves, the stress in its structural members increases and tire wear and energy consumption increase in curves as compared with travel on a straight road.

Also known are various solutions for evening out the load by the use of a plurality of trailers. The drawback here is that the transport combinations are difficult to handle.

It is also known to use wheels with independent suspension, each wheel having its own turntable, so that the wheels easily turn even 180 degrees. In this case the wheels are often steered using electronics and hydraulics. The solution is complex and expensive, and demanding as regards maintenance.

Solutions are also known from Finnish patents 84,895 and 89,570. In these solutions the turning of the axles is provided by affecting the positions of the longitudinal supports of the axle assembly and the suspension bars of the springs, and they very well meet the requirements set on control of axle turning, load distribution on different axles, wheel movement in the direction of rotation, and co-operation of successive axles in multi-axle tandem axle assemblies.

Solutions are also known from Finnish patent application 954,662. In these solutions compensation for the lifting action of the chassis and mechanical control of the axle carrying members of the transport vehicle are achieved when the axles are turned. These features have certain positive effects on the operation of the transport vehicle.

As was mentioned above, a tow bar construction between a tractor and a trailer, or between tractors or trailers has not been described in the above publications. Utilizing a tow bar for steering a tractor and a trailer, and tractors and trailers, would be structurally advantageous and flexible in use.

It is an object of the present invention to provide solutions for using a tow bar in steering the axles of a trailer or a corresponding transport vehicle.

In the present invention, steering is effected mechanically by the action of the tow bar turning angle in a plane parallel to the surface of the road, the angle being formed in curves relative to the tow bar and the chassis of the trailer. Although the steering force is mechanically transmitted directly to all trailer axles intended to be turned, it is also possible to use e.g. a hydraulic servo. The turntable commonly used in trailers is replaced by e.g. an axle suspension according to Finnish patents 84,895 and 89,570.

The construction of the invention allows the turning of one or more axle assemblies in a trailer, whereby also the following essential requirements are met: load compensation between axles, wheel movement to their direction of rotation in curves, trailer follows tractor travel track in curves, reduced energy consumption and e.g. tire wear in curves, and a lesser general stress on the construction elements.

The manner of steering in accordance with the invention also allows several successive trailers to be connected and steered as described above, steering power and steering geometry being transmitted to each trailer from the tow bar and the preceding trailer. It is also possible to couple together several motorized vehicles or couple together motorized and non-motorized transport vehicles arbitrarily as will be described below.

There may be one or more axles steered by the tow bar, and even non-steerable axles may be included in the transport vehicle. At least the following alternative arrangements may be listed incorporatedable subject invention:

one steering axle and one or more fixed axles two steering axles and one or more fixed axles three steering axles and one or more fixed axles four steering axles and one or more fixed axles two steering axles three steering axles four steering axles.

Even other combinations can be implemented with the tow bar construction of the invention.

In the following the invention will be described in more detail by means of examples of some embodiments with reference to the attached drawings.

BRIEF DESCRIPTION OF THE DRAWINGS

FIG. 7A is a top view of a situation where a tractor equipped with turning rigid axles tows the trailer of FIG. 7 in a curve;

FIG. 9 is a side view of the transport vehicle combination of the invention, formed of two vehicles coupled together with a tow bar;

FIG. 10 is a top view of the transport vehicle combination of FIG. 9;

FIG. 11 is a top view of the transport vehicle combination of FIG. 9 in a curve;

FIG. 12 is a separate side view of the tow bar shown in FIGS. 9 through 11, and

FIG. 13 is a top view of the tow bar of FIG. 12.

DETAILED DESCRIPTION OF THE INVENTION

Figure 1:
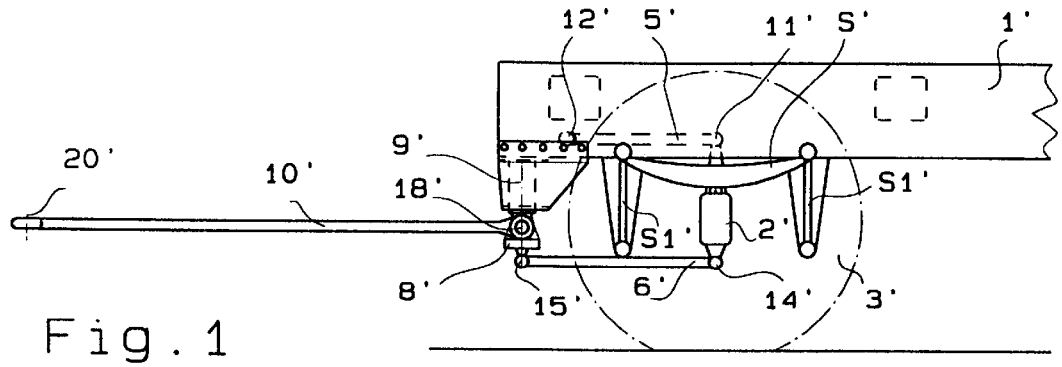
FIG. 1 is a side view of a partial trailer equipped with one steerable rigid axle and a tow bar according to the invention.
Figure 2:
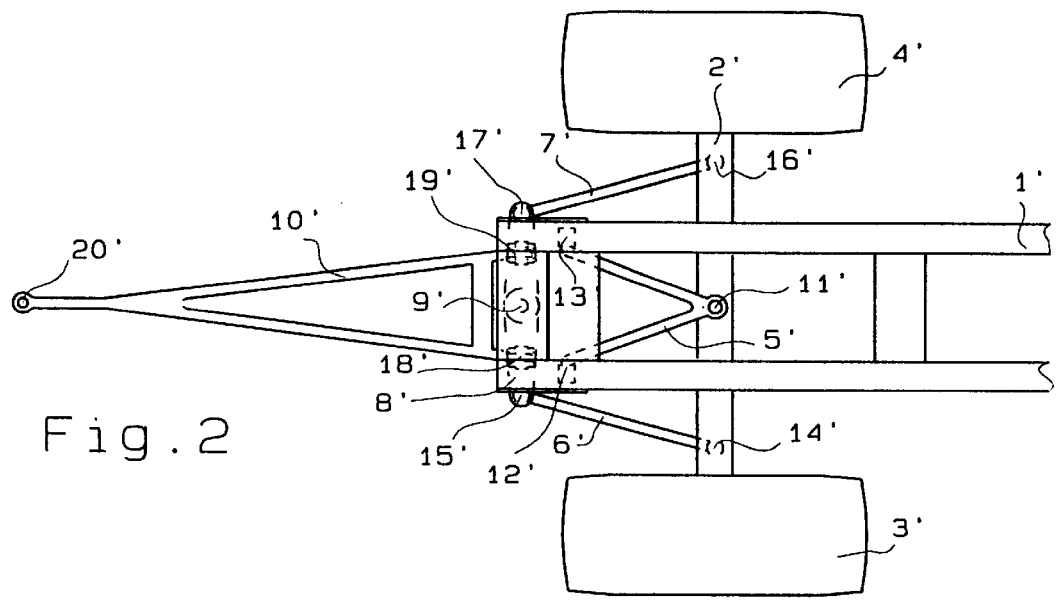
FIG. 2 is a top view of the trailer of FIG. 1.
Figure 3:
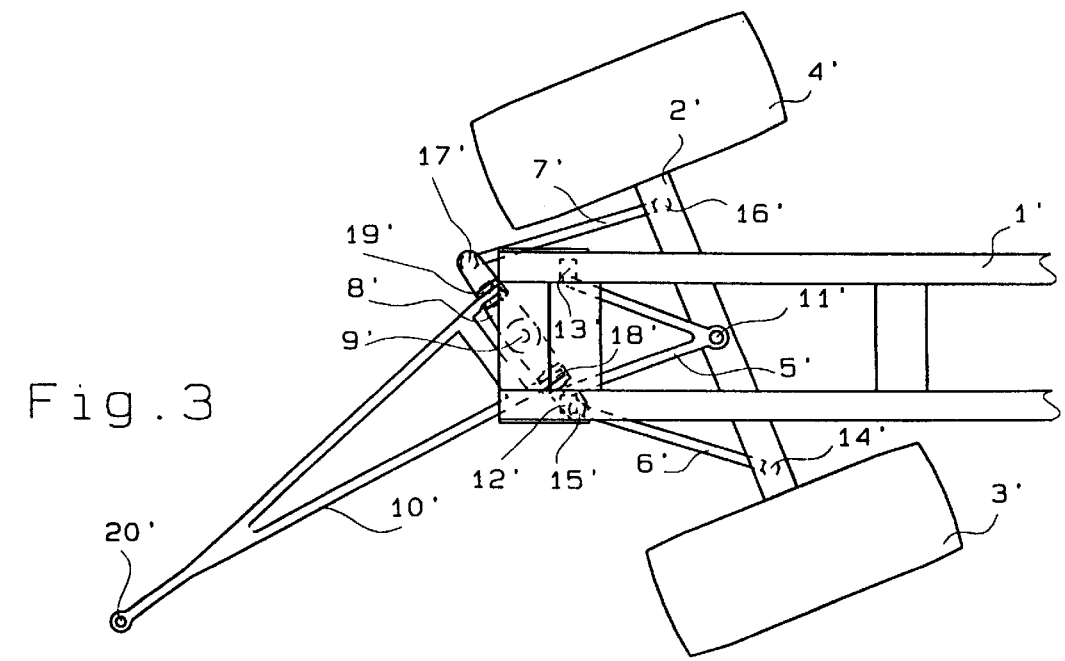
FIG. 3 is a top view of the trailer of FIG. 1 with the tow bar turned with resulting turning of the axle.

The trailer shown in FIGS. 1 through 3 comprises a chassis 1' with one rigid steerable axle 2' to whose ends have been secured wheels 3' and 4', which can be twin wheels if needed.

The axle 2' is secured to the chassis 1' by a triangle or a V-support 5', secured at one point to the middle (or mid point) of the axle 2' by a ball joint 11' and journalled at two points to opposite sides of the chassis 1' by means of joints 12' and 13'. This suspension permits a vertical flexible movement or a vertical rotation and a steering horizontal rotation of the axle 2', but prevents a lateral movement of the axle 2' under certain conditions.

Supporting members S', e.g. rigid levers or springs, e.g. bearing or parabolic springs, secured concentrically or eccentrically to the axle 2', are arranged between the axle 2' and the trailer chassis 1' at both ends of the axle 2'.

In order for the axle 2' to be able to be turned, suspension members S1' have been arranged at both ends of supporting members S', which are secured to the chassis 1' by means of said suspension members. The supporting members S' and the suspension members S1' are shown in FIG. 1 only, because if shown in FIGS. 2 and 3, it would only complicate understanding the present invention. These members are previously known in the art and a more detailed description can be found e.g. in the above Finnish patents 84,895 and 89,570.

Since a trailer is concerned, it also comprises a tow bar 10', in this case arranged to rotate about a vertical axle or axis 9' secured to the chassis 1' front or relative to the centre line of the vertical axle 9'. The vertical axle 9' is journalled to the chassis 1'. The tow bar 10' is secured to the vertical axle 9' via a transverse steering lever 8', on which the tow bar 10' is mounted rotatably relative to a transverse horizontal axle, or axis by means of bearings 18' and 19' on both sides of the vertical axle 9'. The reference numeral 20' refers to the towing eyelet of the tow bar 10'.

In order for the axle 2' to be able to be turned via the turning tow bar 10' and the thereto fastened steering lever 8', supporting arms 6' and 7' are arranged between the steering lever 8' and the axle 2', the arms being fastened at one end to the steering lever 8' on opposite sides of said vertical axle 9' by means of ball joints 15' and 17', and at the other end underneath the axle 2' by means of ball joints 14' and 16' on opposite sides of the ball joint 11' of the triangle support 5' therein. The supporting arms 6' and 7' also support the axle 2' and the support forces of the axle 2' in the longitudinal direction of the trailer are transmitted to the chassis 1 via the supporting arms 6' and 7', and further via the vertical axle 9' in so far as the axle support forces are not transmitted to the chassis 1' via the triangle support 5'.

The assembly shown in FIGS. 1 to 3 is suitable as an axle steering assembly in trailers where an inexpensive and simple structure is called for. This assembly provides preferably biaxial and triaxial trailers.

Figure 4:
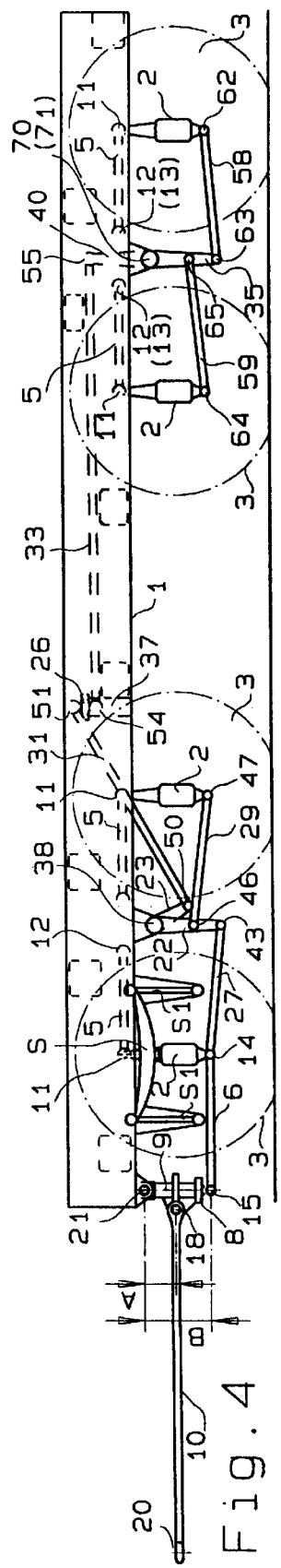
FIG. 4 is a side view of a trailer equipped with two biaxial bogies according to the invention.
Figure 5:
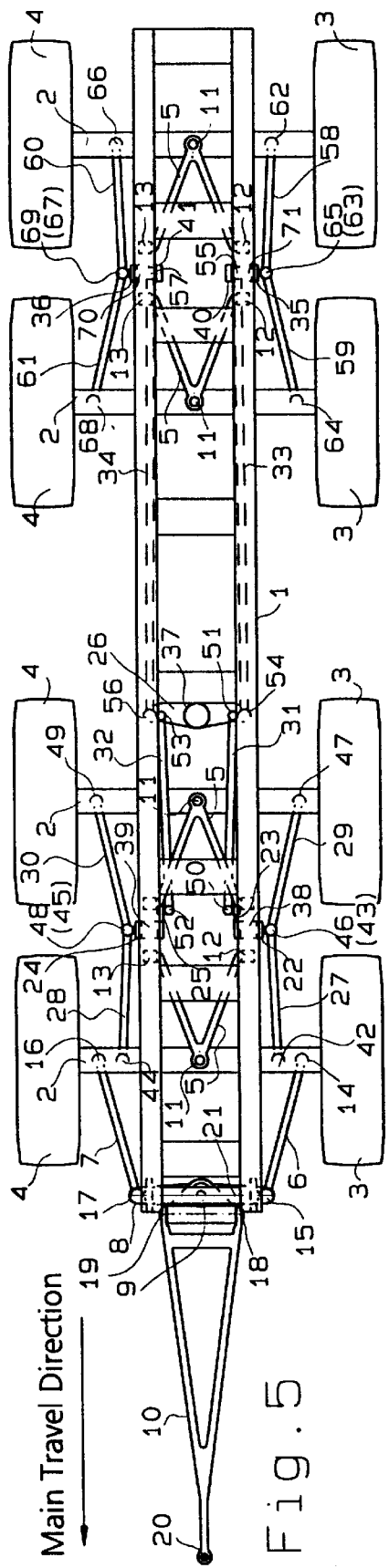
FIG. 5 is a top plan view of the trailer of FIG. 4.
Figure 6:
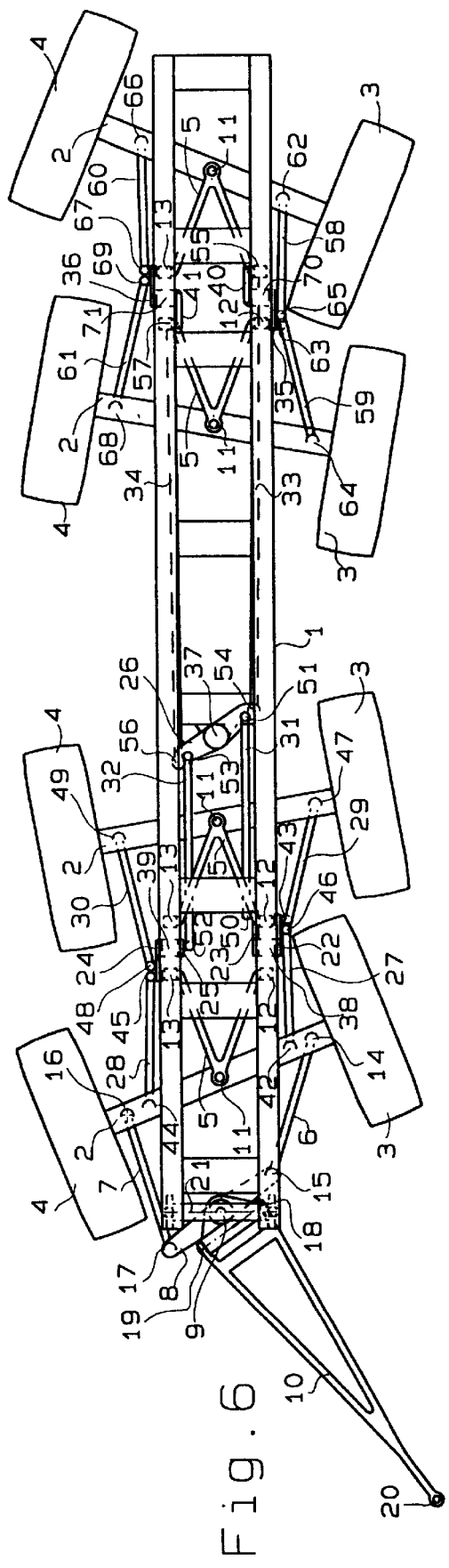
FIG. 6 is a top view of the trailer of FIG. 4 with the tow bar turned with resulting turning of the axles in the whole trailer.

A trailer equipped with two biaxial bogies is shown in FIGS. 4 to 6. All axles, wheels and triangle supports and their articulations are similar to those in the assemblies shown in FIGS. 1 to 3 and have been denoted by the same reference numerals, but without the apostrophe. Also the supporting members S and the suspension members S1 are similar to the supporting members S' and the suspension members S1' shown in FIGS. 1 to 3. The suspension of the suspension members S1 to the chassis 1 is similar to the above except in the middle of the axles in each bogie, where the suspension members S1 are supported on equalizer levers (not shown in the drawings) arranged in the chassis 1. These assemblies are also known from prior art, and described e.g. in the above Finnish patents 84,895 and 89,570. This known support member and suspension lever arrangement has been shown only in FIG. 4 for clarity, and even there only in connection with the first axle.

The tow bar arrangement deviates here from the solutions of FIGS. 1 to 3 in that the vertical axle 9 of the tow bar 10 is secured to the chassis 1 and also rotatably around a horizontal axle 21, and the horizontal bearing arrangement 18, 19 of the tow bar 10 to the steering lever 8 is located at a specified point between a line formed by the articulations 15 and 17 of said horizontal axle 21 and the supporting arms 6 and 7. The distance of the horizontal bearing application 18, 19 from the horizontal axle 21 is denoted by the letter A and the distance of the horizontal axle 21 from a line formed by the support arms 6 and 7 by the letter B. The supporting arms 6 and 7 with their articulations 15, 17 and 14, 16 are as in FIGS. 1 to 3.

Now the vertical axle 9 does not support the axles 2, but distributes the towing force emanating from the tow bar 10 to the chassis 1 and the axles 2 in a desired ratio. If the intention is to have one half of the tow bar 10 rest on the chassis 1 and the other half on the axles 2, the measurement B=2A, i.e. is as shown in FIG. 4.

Based on the quality of the terrain and the road it is possible and preferable to design the division ratio of the tractive force e.g. so that a greater tractive force rests on the chassis 1 than on the axles 2. This is the case in steep ascents when at the same time the resistance to motion of the road is low because of quality surface. Similarly it is preferable to let a greater tractive force rest on the axles 2 than on the chassis 2 in flat country if at the same time the quality of road surface causes quite high resistance to motion.

The assembly of FIGS. 4 to 6 further comprises second steering levers 22 and 24, journalled between the axles 2 of the first bogie to the chassis 1 on its opposite sides and extending downwards from the chassis, to which said axles 2 are coupled via corresponding longitudinal supports 27, 29 and 28, 30 on opposite sides of the chassis 1. The axle articulations of the longitudinal supports 27 and 28 on the side of the first axle are denoted by reference numerals 42 and 44, and the steering lever articulations, arranged at the ends of the steering levers 22 and 24, by reference numerals 43 and 45. The axle articulations of the longitudinal supports 29 and 30 on the side of the second axle are denoted by reference numerals 47 and 49, and the steering lever articulations, arranged between the articulations 38 and 39 of the steering levers 22 and 24 and articulations 43 and 45, by reference numerals 46 and 48.

At the centre line of the chassis 1, behind the second axle 2 of the first bogie, a symmetry lever 26 is further arranged, to opposite sides of whose bearing point 37 are secured connecting rods 31 and 32 by means of joints 51 and 53, the rods being secured together with the second steering levers 22 and 24 at one end to third steering levers 23 and 25, arranged in the same bearing application 38, 39, by joints 50 and 52, so that the second and third steering levers are immobile relative to each other and arranged at the same side of the bearing line, i.e. underneath it.

The trailing bogie is symmetrical relative to the front bogie or, that is, its mirror image except that it has no connecting rod nor tow bar arrangements symmetrical with the front bogie. In the trailing bogie the longitudinal supports are denoted by reference numerals 59, 61 and 58, 60. Their axle articulations are denoted by reference numerals 64, 68 and 62, 66, and the articulations to the steering levers 35 and 36 by reference numerals 65, 69 and 63, 67. The front longitudinal supports 59 and 61 of the trailing bogie are articulated to the steering levers 35 and 36 at the same distance from their bearing points 70 and 71 as the rear longitudinal supports 29 and 30 from the bearing points 38 and 39 of the steering levers 22 and 24, and the rear longitudinal supports 58 and 60 of the trailing bogie in the same way as the front longitudinal supports 27 and 28 of the front bogie, if the trailing bogie is to follow the front bogie in curves. If the bogie is to have different turning radiuses, a lever ratio difference is selected between the front and the trailing bogies.

Fourth steering levers 40 and 41, extending upwards from the bearing applications 70 and 71, are secured immobile relative to the steering levers 35 and 36 to the bearing applications 70 and 71 of the steering levers 35 and 36 of the trailing bogie (in this case said steering levers 35 and 36 may be called fifth steering levers). These fourth steering levers 40 and 41 have been connected by connecting rods 33 and 34 to said symmetry lever 26 by joints 55, 57 and 54, 56 in order for the axles of the trailing bogie to turn symmetrically with the axles of the front bogie.

In some cases it is possible and advantageous for dimensioning reasons to divide the connecting rods 31 and 32 on the side of the front bogie into two parts, the junction being journalled to the chassis by a separate supporting arm.

Figure 7:
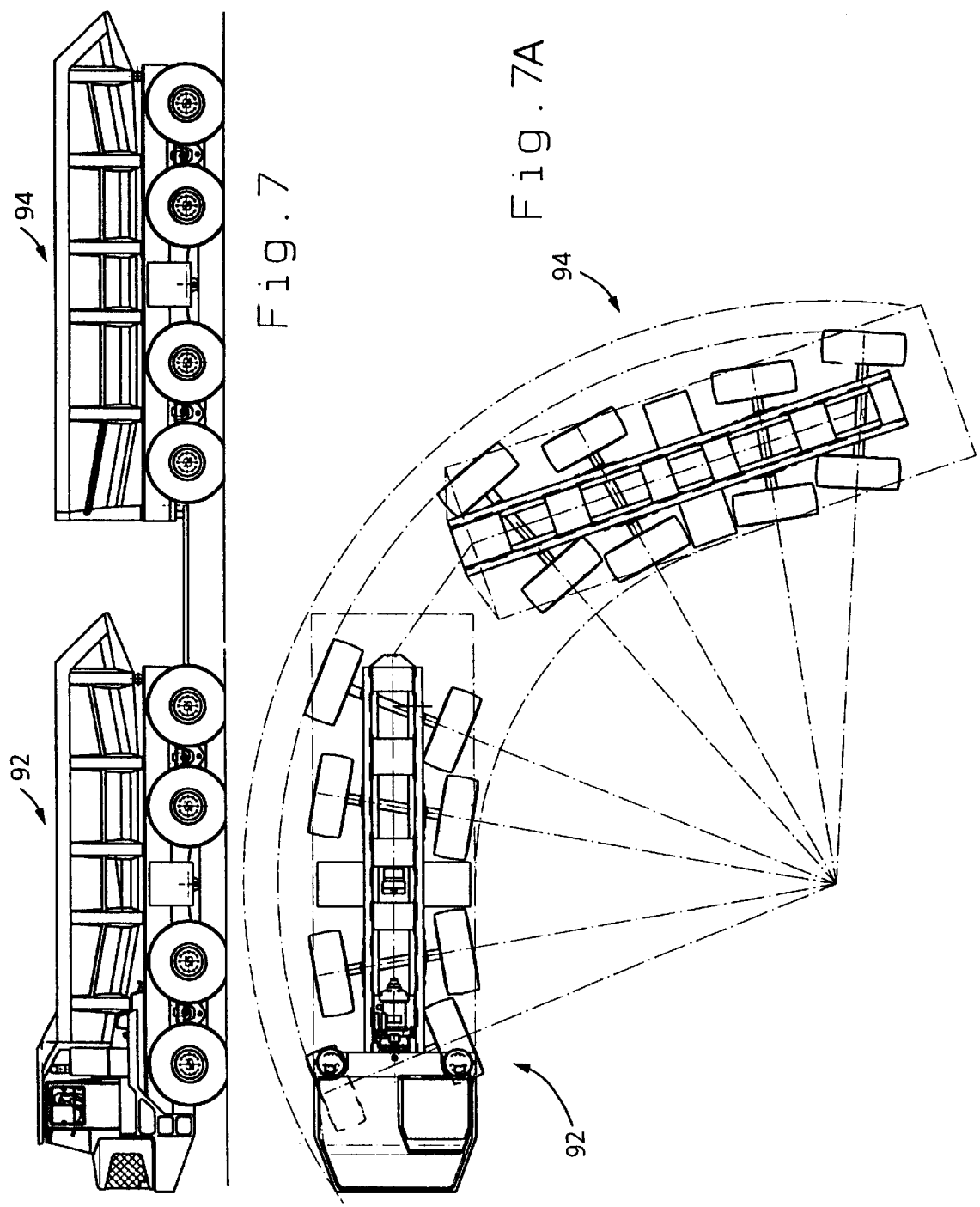
FIG. 7 is a side elevation of a tractor towing a trailer of the type shown on FIGS. 4–6.

FIGS. 7 and 7A illustrate a tractor 92 towing a trailer 94, each having a pair of biaxial bogies and illustrating the manner in which the wheels of the tractor and trailer are steered through a curve, using the construction described in connection with FIGS. 1–6.

Figure 8:
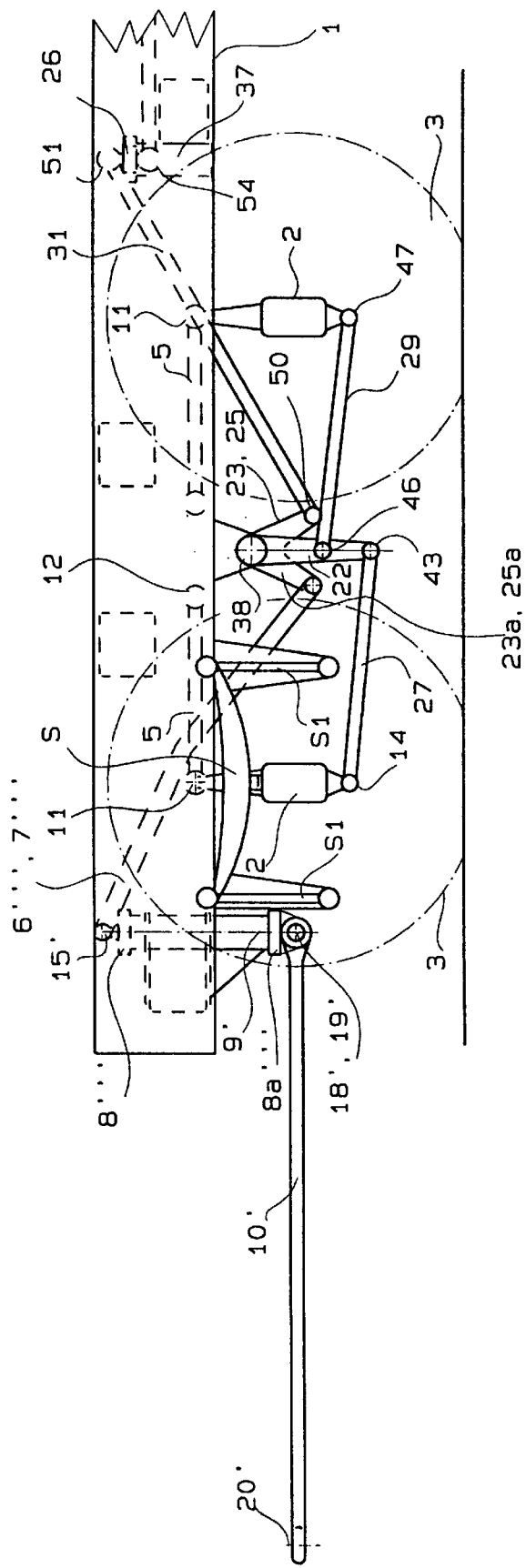
FIG. 8 shows an alternative version of the tow bar steering of the previous Figures.

The axle assembly of the tow bar construction of FIG. 8 corresponds essentially to the front axle structure shown in FIGS. 4 to 6. The front end of the actual tow bar construction partially corresponds to the structure shown in FIGS. 1 to 3. The difference is that the control force and movement are led from over to the middle of the tandem axles by means of a steering lever 8''' fastened to the upper end of the vertical axle 9'. The steering movement of the tow bar 10' is transmitted to a steering lever 8a''' by means of horizontal bearing applications 17' and 18' and further to the vertical axle 9' and further via the steering lever 8''' and via supporting arms 6''' and 7''' to auxiliary arms 23a and 25a of the steering levers 23 and 25, and this way controls the trailer steering lever system.

Functionally, the same result would be achieved e.g. by connecting the steering lever 8''' and the symmetry lever 26 by articulated supporting arms. This has not been shown and it is obvious that there are other solutions to resolve the matter. The other steering lever 8''' can also remain down to accomplish the steering shown in FIGS. 1 to 6.

All the axles, wheels, triangle supports with their articulations, the support and suspension members of the axles, and the means connecting and controlling the axles in the transport vehicle combination of FIGS. 9 to 11 are similar to those in the assembly shown in FIGS. 4 to 6. These members have not, however, been numbered other than in the immediate vicinity of the tow bar construction.

The cabs and controls of each vehicle are arranged at the extreme ends of the formed combination, so that the combination can be driven from either end according to the need and operates in practice so that the vehicle chosen to be driven operates as the tractor or the steering vehicle and the other as the trailer. In the situation described, the left hand vehicle has been described as the towing vehicle, i.e. the tractor, and the right hand vehicle as the vehicle to be towed, i.e. the trailer.

An additional characteristic of the reference numerals associated with the tow bar construction is a double apostrophe (''), although the part concerned would be essentially the same as in FIGS. 4 to 6.

The tow bar 10" connecting the vehicles at their rear ends is connected to the rear ends of the respective vehicles by vertical bearing applications 9" and horizontal bearing applications 18", 19" and 21", essentially similar to those in FIGS. 4 to 6, and hence not described in any more detail here. The steering lever 8" associated with the tow bar and its suspensions (6", 7") to the axles 2 are essentially similar to those in FIGS. 4 to 6.

The tow bar 10" concerned is further equipped with additional articulation and associated locking and releasing members to be described below. To implement this, horizontal plates 74", 75" and 76", 77" are fastened to the horizontal axle assemblies 18", 19", respectively. Between these plates have been secured journals equipped with ball joints 78", 80'" by means of coupling pins 79" and 81" that run through said horizontal plates and ball joints. Axially sliding locking members 71", 72" are journalled to the tow bar 10', and one journal at a time can be locked by the locking members so that it is essentially prevented from rotating horizontally, i.e. its also turns the steering lever 8" on that side, and at the same time releases the other journal so that is can rotate freely essentially in the horizontal plane without turning with it the steering lever on this side. This articulation is, however, such that the tow bar 10" can rotate freely relative to its longitudinal axle.

For locking and releasing, both ends of the locking members 71", 72" comprise locking safety wedges 83", 84"; 85", 86" which can be locked into locking grooves 87", 88"; 89", 90" (see FIGS. 11 and 12) formed in the plates 74", 75" and 76", 77", respectively. The locking members 71", 72" are moved by a pin 82" in an actuator 73". The actuator 73" is fixedly secured to the middle of the tow bar 10". The pin 82" can move hydraulically, pneumatically, electrically or mechanically. In the situation shown, the locking member part 72" is locked in the locking grooves 89", 90" in the plates 76", 77", and the locking member part 71" is released from the locking grooves 87", 88" in the plates 74", 75". The pin 82" has two positions only, i.e. its locks the journal on the side of the vehicle to be towed and simultaneously releases the journal on the side of the towing vehicle. The selection can be made automatically or it can be selected when the driver starts to prepare the combination for transport.

The locking members 71", 72" allow a turning movement relative to each other, and a turning movement of the tow bar 10" around its axle, the longitudinal tilting between the transport vehicles being unobstructed. The free rotation of the journal on the side of the tractor in a plane parallel to the surface of the road is preferable e.g. because the tractor axles can be turned from one extreme position to another even when the combination is not moving.

If the turning of the axles of the transport vehicle to be towed has been e.g. hydraulically powered, power steering is taken from the angular difference between the tow bar towing it and the transport vehicle to be towed in the horizontal plane.

Power steering arrangements always exist in towing tractors, but are not necessary in trailers.

Combinations to be transported to both directions, such as have been described here, are needed in surroundings where arranging space for turning the combination becomes significantly expensive. Such typical surroundings include e.g. a drift mine.

The tow bar constructions and transport vehicle combinations of the invention have been described in the above only by means of a few examples of preferred embodiments, but is it obvious that the invention can be modified without departing from the scope defined in the attached claims, and apply it to a plurality of different axle assemblies and transport vehicle combinations. This means that e.g. the transport vehicle combination can comprise more than two transport vehicles, e.g. three or more, both extreme ends or only one extreme end of the combination comprising a motorized towing vehicle. Only one motor can move the combination and it can be arranged in any one of the vehicles. The combination may also comprise vehicles and/or trailers in an arbitrary order. The tow bars of the invention connecting the transport vehicles can also be chosen according to the particular need. Naturally the axles can be single axles or tandem axles according to the need, and their number can also vary according to the need. The driver of the combination can also be replaced by automatic control with the steering mechanisms remaining as described above.

What is claimed is:

1. A combination tow bar and trailer construction, the trailer having a chassis and a tandem axle, the construction comprising:
    at least two rigid axles secured to the chassis of the trailer;
    wheels secured to the opposite ends of each of said two rigid axles;
    supporting members arranged at said opposite ends of each of said two rigid axles between said two rigid axles and the chassis of the trailer;
    wherein at least one of said rigid axles includes
        suspension members arranged at opposite ends of said supporting members, said suspension members being secured at respective first ends to said supporting members and at respective second ends to said chassis;
        a triangle support pivotally secured to said at least one of said two rigid axles at a location intermediate said opposite ends of said at least one rigid axle and journalled at two locations to opposite sides of said chassis;
        a tow bar journalled to a front portion of said chassis rotatably relative to a vertical pivot axle and a horizontal pivot axle,
        a steering lever secured to said tow bar rotatably relative to a center line of said vertical pivot axle, and supporting arms, respectively, secured at first ends to said steering lever on opposite sides of said vertical pivot axle and at opposite ends to said at least one rigid axle adjacent said opposite ends thereof;
        means coupled to said at least one rigid axle for implementing a turning movement in said at least two rigid axles located behind said at least one rigid axle;
        second steering levers journalled, respectively, to said opposite sides of said chassis between said two rigid axles, said two rigid axles being coupled to said second steering levers via front and back longitudinal supports on said opposite sides of said chassis, respectively;
        a transverse symmetry lever journalled behind the other of said two axles to the chassis at a center line thereof; and
        connecting rods secured at respective first ends to opposite sides of said symmetry lever, said connecting rods being secured at opposite second ends to said second steering levers.

2. The construction as claimed in claim 1, wherein said front longitudinal supports are secured to the second steering levers at a different distance from respective bearing points of said second steering levers than said rear longitudinal supports.

3. The construction as claimed in claim 2, wherein said connecting rods are secured together with said second steering levers to third steering levers arranged at said bearing points so that the second and the third steering levers are immobile relative to each other.

4. The construction as claimed in claim 1, wherein said vertical pivot axle of said tow bar is journalled at its upper end to said chassis rotatably relative to a second horizontal pivot axle, and wherein said horizontal pivot axle securing the tow bar to the vertical pivot axle is located at a predetermined height between said second horizontal pivot axle and said first ends of said supporting arms in order for tow bar forces to be distributed between said chassis and said at least two rigid axles.

5. A combination trailer and tow bar including:
    a trailer having a chassis and two bogies including a forward bogie and a rearward bogie, each bogie comprising:
        two rigid axles;
        wheels secured to respective opposite ends of each of said two rigid axles of each bogie;
        chassis supporting members located adjacent said opposite ends of each of said two rigid axles, supported between said chassis and said two rigid axles;
        suspension members arranged at both ends of said chassis supporting members, each suspension member secured at one end to a respective chassis supporting member and at an opposite end to the chassis;
        a triangle support for each of said two rigid axles, each said triangle support articulated at an apex thereof to a middle portion of a respective one of said two rigid axles and journalled at two other points to opposite sides of the chassis;
    a tow bar journalled to a front end of the chassis adjacent a first of said two rigid axles of said forward bogie for rotation relative to a vertical axis and a horizontal axis;
    a steering lever secured to the tow bar for rotation relative to said vertical axis;
    supporting arms secured at one end of the steering lever on opposite sides of said vertical axis, and at an opposite end to said first of said two rigid axles on opposite sides of said apex of said triangle support;
    second steering levers journalled to said chassis on opposite sides thereof between said two rigid axles of said forward bogie, said two rigid axles of said forward bogie coupled to said second steering levers via respective pairs of forward bogie longitudinal supports on opposite sides of said chassis;
    a symmetry lever pivotally secured at a mid-point thereof to said chassis behind a rearward one of said two rigid axles of said forward bogie;

a first pair of connecting rods extending respectively between third steering levers fixed to said second steering levers, and ends of said symmetry lever on opposite sides of said mid-point;

a second pair of connecting rods extending respectively between said ends of said symmetry lever and fourth steering levers journalled to opposite sides of said chassis between the two rigid axles of said rearward bogie; and rear bogie longitudinal supports extending, respectively, between the two rigid axles of the rearward bogie and fifth steering levers fixed to said fourth steering levers.

6. A tow bar construction as claimed in claim 5 wherein the longitudinal supports of the forward and rearward bogies, and force effects of said steering levers are mutually reversed, thus eliminating braking forces, accelerating forces and motion resistance forces of the forward and rearward bogies.

7. A tow bar construction as claimed in claim 5 wherein the vertical axle of the tow bar is journalled at its upper end to the chassis rotatably relative to a second horizontal axle, and wherein said horizontal axle securing of the tow bar to the vertical axle is located at a predetermined height between the second horizontal axle and the articulation of the supporting arms arranged in the vertical axle in order for the tow bar forces to be distributed between the chassis and the axle assembly as desired.

8. A transport combination formed of two vehicles joined together at respective rearward ends thereof by means of a tow bar, each vehicle having a cab at respective forward end thereof in which vehicle controls are located, such that the combination can be driven from either cab, each vehicle comprising:

a chassis;

at least two axle assemblies, each having at least one axle and including a rear axle;

wheels secured to opposite ends of each axle;

supporting members arranged at said opposite ends of each axle, and located between the axles and the chassis of the vehicle;

suspension members arranged at both ends of both supporting members, the suspension members each being secured at one end to the supporting members and at an opposite end to said chassis;

a triangle support associated with each axle and articulated at one point to a middle of the axle, and journalled at two points to opposite sides of said chassis;

means arranged between the axles for transmitting a turning movement directed at one axle to all other axles intended to be turned;

wherein the tow bar is journalled to the rearward end of each vehicle, rotatably relative to vertical and horizontal bearing applications;

steering levers secured to opposite ends, respectively, of the tow bar rotatably relative to said vertical bearing application; and supporting arms secured at respective first ends to a respective steering lever on opposite sides of said vertical bearing application and at second opposite ends of the rear axle of the respective vehicles, on opposite sides of said one point of said triangle support.

9. The combination as claimed in claim 8, wherein opposite ends of the tow bar comprise an additional articulation and means for locking and releasing the additional articulation at only one end at a time, the end of the tow bar which is released and is always on the side of the driven vehicle being able to rotate in a plane parallel to a surface of a road without affecting the steering lever on that side.

10. A transport vehicle combination as claimed in claim 8, wherein the additional articulations comprise coupling pins secured between horizontal plates fastened to the horizontal bearing applications, the pins being pushed through ball joints at the ends of the two bar arranged between said plates, and wherein the means for locking and releasing the additional articulation are formed of locking members that slide by means of an actuator and a pin from the middle of the tow bar, the locking members being able to be locked into counter locking members arranged in the horizontal plates.

11. A transport vehicle combination as claimed in claim 8, wherein both vehicles are motorized and operate in practice so that the vehicle selected to be driven operates as the tractor and the other as the trailer.

12. A transport vehicle combination as claimed in claim 8, wherein only one of the vehicles includes a motor.

13. A transport vehicle combination formed of at least three vehicles joined together by means of tow bars, each vehicle having a chassis and at least two axle assemblies, each axle assembly having at least one axle;

wheels secured to opposite ends of each axle;

supporting members arranged at said opposite ends of each axle, and located between the axles and the chassis of the vehicle;

suspension members arranged at both ends of both supporting members, the suspension members each being secured at one end to a respective supporting member and at an opposite end to said chassis;

a triangle support in association with each axle, connected via a ball joint to a middle point of the axle, and journalled at two points to opposite sides of said chassis;

means arranged between the axles for transmitting a turning movement directed at one axle to all other axles intended to be turned; wherein at least the vehicles at extreme ends of the combination comprise cabs and controls so that the combination can be driven from either end; and further wherein opposite ends of the tow bars are journalled rotatably relative to vertical and horizontal bearing applications at respective ends of the vehicles;

steering levers are secured to both ends of the tow bars rotatably relative to the center lines of their vertical bearing application;

supporting arms are coupled to the steering levers and secured at one end to the steering levers on opposite sides of said vertical bearing application, and at the other end to that axle of the vehicle that is nearest to the tow bar, on opposite sides of said ball joint.

14. A transport vehicle combination as claimed in claim 13, wherein at least the vehicles at the extreme ends are motorized vehicles and operate in practice so that the vehicle selected to be driven operates as the tractor and the others as trailers.

15. A transport vehicle combination as claimed in claim 13, characterized in that only one of the vehicles includes a motor.

16. A transport vehicle combination as claimed in claim 13 wherein said vehicles are equipped with automatic controls.

* * * * *